(12) United States Patent
Katayama

(10) Patent No.: US 6,691,673 B2
(45) Date of Patent: Feb. 17, 2004

(54) FUEL SUPPLY DEVICE FOR OUTBOARD MOTOR

(75) Inventor: Goichi Katayama, Shizuoka (JP)

(73) Assignee: Yamaha Marine Kabushiki Kaisha, Shizuoka (JP)

(*) Notice: Subject to any disclaimer, the term of this patent is extended or adjusted under 35 U.S.C. 154(b) by 0 days.

(21) Appl. No.: 10/227,354

(22) Filed: Aug. 22, 2002

(65) Prior Publication Data
US 2003/0037762 A1 Feb. 27, 2003

(30) Foreign Application Priority Data
Aug. 22, 2001 (JP) ........................................ 2001-251913

(51) Int. Cl.⁷ ............................................... F02M 55/00
(52) U.S. Cl. ........................ 123/305; 123/470; 123/468
(58) Field of Search ............................. 123/195 P, 305, 123/470, 468, 469, 456, 73 C, 193.5; 440/88 A, 88 F, 900

(56) References Cited

U.S. PATENT DOCUMENTS

| | | | | |
|---|---|---|---|---|
| 4,111,161 A | * | 9/1978 | Ueno et al. ..................... 123/3 |
| 4,779,594 A | * | 10/1988 | Oda et al. .................... 123/432 |
| 4,909,221 A | * | 3/1990 | Heuser ........................ 123/470 |
| 5,062,395 A | * | 11/1991 | Tateno .................... 123/65 VD |
| 5,063,886 A | * | 11/1991 | Kanamaru et al. ...... 123/65 VD |
| 5,146,897 A | * | 9/1992 | Hattori et al. ............... 123/470 |
| 5,357,931 A | * | 10/1994 | Semence .................... 123/456 |
| 5,394,850 A | * | 3/1995 | Murphy et al. ............. 123/470 |
| 5,465,699 A | * | 11/1995 | Voigt ............................ 123/470 |
| 5,568,798 A | * | 10/1996 | Lorraine ..................... 123/456 |
| 5,664,533 A | * | 9/1997 | Nakayama et al. ..... 123/184.42 |
| 5,682,859 A | * | 11/1997 | Wakeman .................... 123/470 |
| 5,738,076 A | * | 4/1998 | Kim ............................. 123/527 |
| 5,771,863 A | * | 6/1998 | Daly ............................ 123/456 |
| 5,816,213 A | * | 10/1998 | Gaviani et al. .......... 123/198 E |
| 5,894,831 A | * | 4/1999 | Takahashi et al. ........... 123/470 |
| 5,934,252 A | * | 8/1999 | Hafner et al. ................ 123/468 |
| 6,053,145 A | | 4/2000 | Suzuki et al. ................ 123/298 |
| 6,062,195 A | | 5/2000 | Tanaka et al. ............... 123/305 |
| 6,189,503 B1 | | 2/2001 | Takano ........................ 123/302 |
| 6,205,974 B1 | | 3/2001 | Yonezawa et al. .......... 123/305 |
| 6,213,825 B1 | | 4/2001 | Ozawa ...................... 440/88 A |
| 6,220,217 B1 | | 4/2001 | Kato ....................... 123/198 D |
| 6,223,715 B1 | | 5/2001 | Suzuki ......................... 123/294 |
| 6,286,472 B1 | | 9/2001 | Takahashi et al. ...... 123/184.34 |
| 6,302,086 B1 | | 10/2001 | Kato ............................ 123/456 |
| 6,302,088 B1 | | 10/2001 | Kato ............................ 123/470 |
| 6,357,402 B1 | | 3/2002 | Kato ........................... 123/73 C |
| 6,408,835 B1 | | 6/2002 | Katayama et al. ........... 123/572 |
| 6,415,773 B1 | | 7/2002 | Katayama et al. ........... 123/541 |
| 2001/0047776 A1 | | 12/2001 | Takahashi et al. ......... 123/58.1 |
| 2002/0073971 A1 | | 6/2002 | Katayama .................... 123/478 |

* cited by examiner

*Primary Examiner*—Hieu T. Vo
*Assistant Examiner*—Hai Huynh
(74) *Attorney, Agent, or Firm*—Knobbe, Martens, Olson & Bear, LLP

(57) ABSTRACT

An integrated fuel delivery system is cooled by induction air providing a higher density air/fuel mixture to fuel injectors. The fuel delivery system is integrated within an intake passage body eliminating the need for additional fuel delivery conduits, thus decreasing the size of the engine and lowering the production costs of the outboard motor. The integrated fuel delivery system enables the operator to enjoy compact engine design, improved engine performance and increased fuel efficiency.

17 Claims, 7 Drawing Sheets

FUEL SUPPLY DEVICE FOR OUTBOARD MOTOR

PRIORITY INFORMATION

This application is based on and claims priority to Japanese Patent Application No. 2001-251913, filed Aug. 22, 2001 the entire contents of which is hereby expressly incorporated by reference.

BACKGROUND OF THE INVENTION

1. Field of the Invention

The present invention relates generally to an engine fuel delivery system for an engine, and more particularly to an improved engine fuel delivery system incorporated within an intake passage body improving the cooling of delivery fuel and allowing for a more compact engine design.

2. Brief Description of Related Art

Engines typically incorporate a fuel delivery system. The fuel delivery system commonly uses externally mounted fuel delivery conduits to delivery fuel to a fuel injection system.

Operator demand for smooth running, highly responsive engines with improved fuel economy can be addressed with externally mounted fuel delivery systems. The ability to provide the engine with an accurately measured amount of fuel allows the engine to operate smoothly during various conditions.

Due to compact engine design demands, fuel delivery systems are placed very close to the engine body and therefore the fuel is unnecessarily heated allowing for unwanted fuel vaporization. Some outboard engine designs fail to deliver fuel to and from the engine at proper, efficient temperatures. These engine designs cannot reliably provide an optimal fuel delivery environment to allow the engine to perform at its highest potential.

SUMMARY OF THE INVENTION

One aspect of the present invention includes the realization that a portion of an induction system can be used to form a fuel conduit for a fuel injection system. By using a portion of the induction system to form a fuel conduit for the fuel injection system, the fuel can be kept at a more uniform temperature.

Another aspect of the present invention includes various fuel injector mounting embodiments to correctly position the fuel injector, simplify production, and lower overall production costs.

In accordance with a further aspect of the invention, an engine includes an engine body comprising a cylinder body having at least one variable volume combustion chamber. At least one intake port opens into the chamber. An induction system communicates with the intake port through at least one intake passage. An intake valve is moveable to regulate communication between the induction system and the combustion chamber through the port and the intake passage. A fuel delivery system includes at least one fuel delivery passage connected to at least one fuel injector. The fuel delivery passage is defined by the intake passage. The fuel injector is positioned between the cylinder body and the intake passage. The intake passage communicates with the fuel injector and the fuel injector is configured to deliver fuel to the combustion chamber.

In accordance with yet another aspect of the present invention, an engine comprises an engine body defining at least one combustion chamber. An induction system is configured to guide air to the combustion chamber. A fuel system comprises at least one fuel passage configured to deliver fuel to the combustion chamber for combustion therein. At least a portion of the fuel passage is defined by a portion of the induction system.

In accordance with another aspect of the present invention, an internal combustion engine comprises an engine body defining at least one combustion chamber. An induction system is configured to guide air to the combustion chamber. A fuel system is configured to deliver fuel to the combustion chamber for combustion therein. The fuel system includes at least one fuel injector mounted for injecting fuel directly into the combustion chamber. The induction system including means for defining at least a portion of the fuel system.

In accordance with another aspect of the present invention, an outboard motor comprises an engine, the engine includes an engine body defining at least one combustion chamber therein. An induction system is configured to guide air to the combustion chamber. A fuel injection system is configured to inject fuel for combustion in the combustion chamber. The fuel injection system includes at least one fuel injector and a fuel delivery passage configured to deliver fuel to the fuel injector. At least one portion of the induction system defines at least a portion of the fuel delivery passage.

In accordance with a further aspect of the present invention, an outboard motor comprises an internal combustion engine. The engine includes an engine body defining at least one combustion chamber therein. An induction system is configured to guide air to the engine body for combustion in the combustion chamber. A fuel system is configured to supply fuel for combustion in the combustion chamber. The induction system also comprises means for defining at least a portion of a fuel passage of the fuel system.

BRIEF DESCRIPTION OF THE DRAWINGS

The foregoing features, aspects, and advantages of the present invention will now be described with reference to the drawings of preferred embodiments that are intended to illustrate and not to limit the invention. The drawings comprise seven figures in which.

DETAILED DESCRIPTION OF THE PREFERRED EMBODIMENTS OF THE INVENTION

Overall Description

Figure 1:
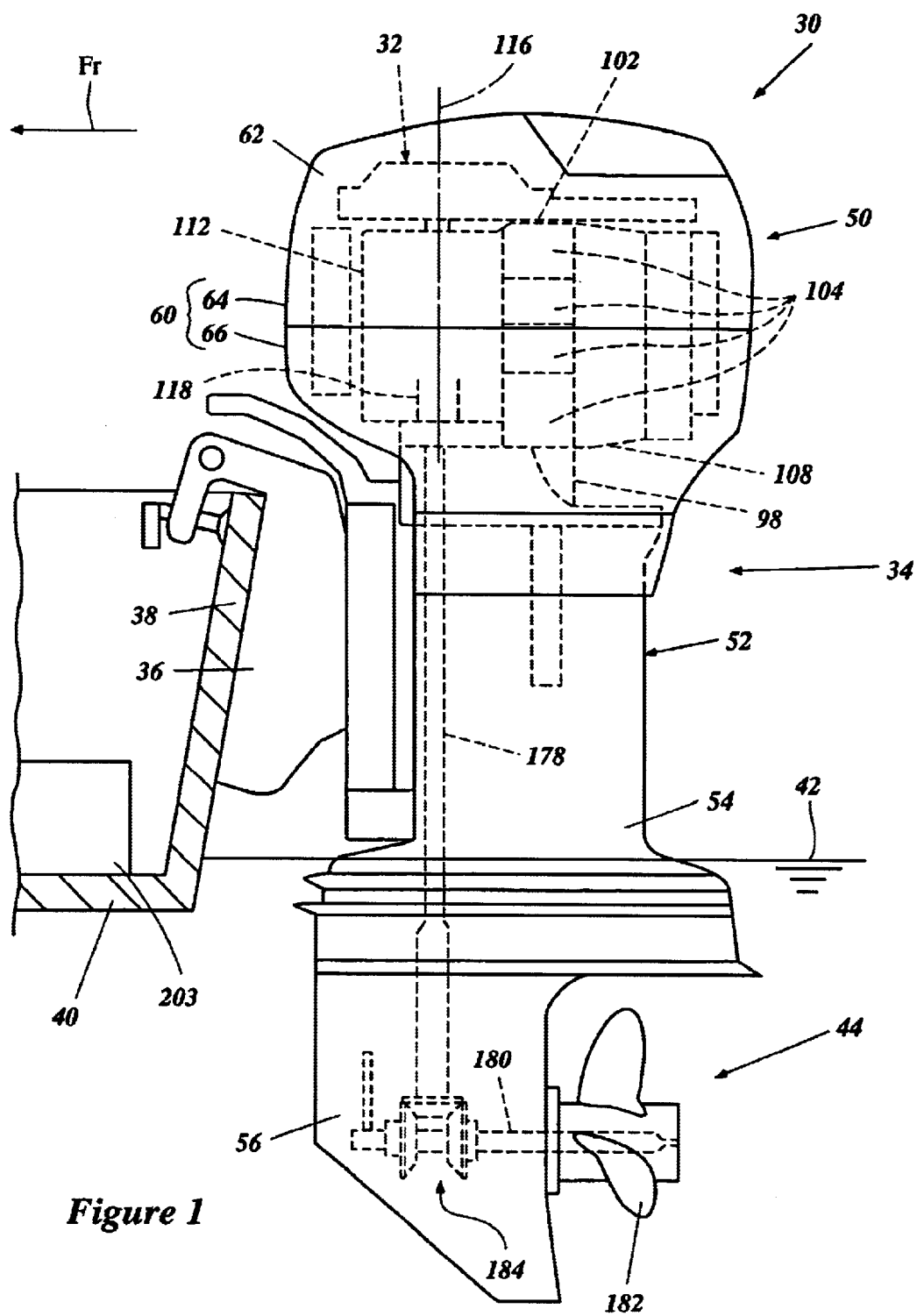
FIG. 1 is a side elevational view of an outboard motor configured in accordance with a preferred embodiment of the present invention, with an engine and drive train shown in phantom and an associated watercraft partially shown in section.
Figure 2:
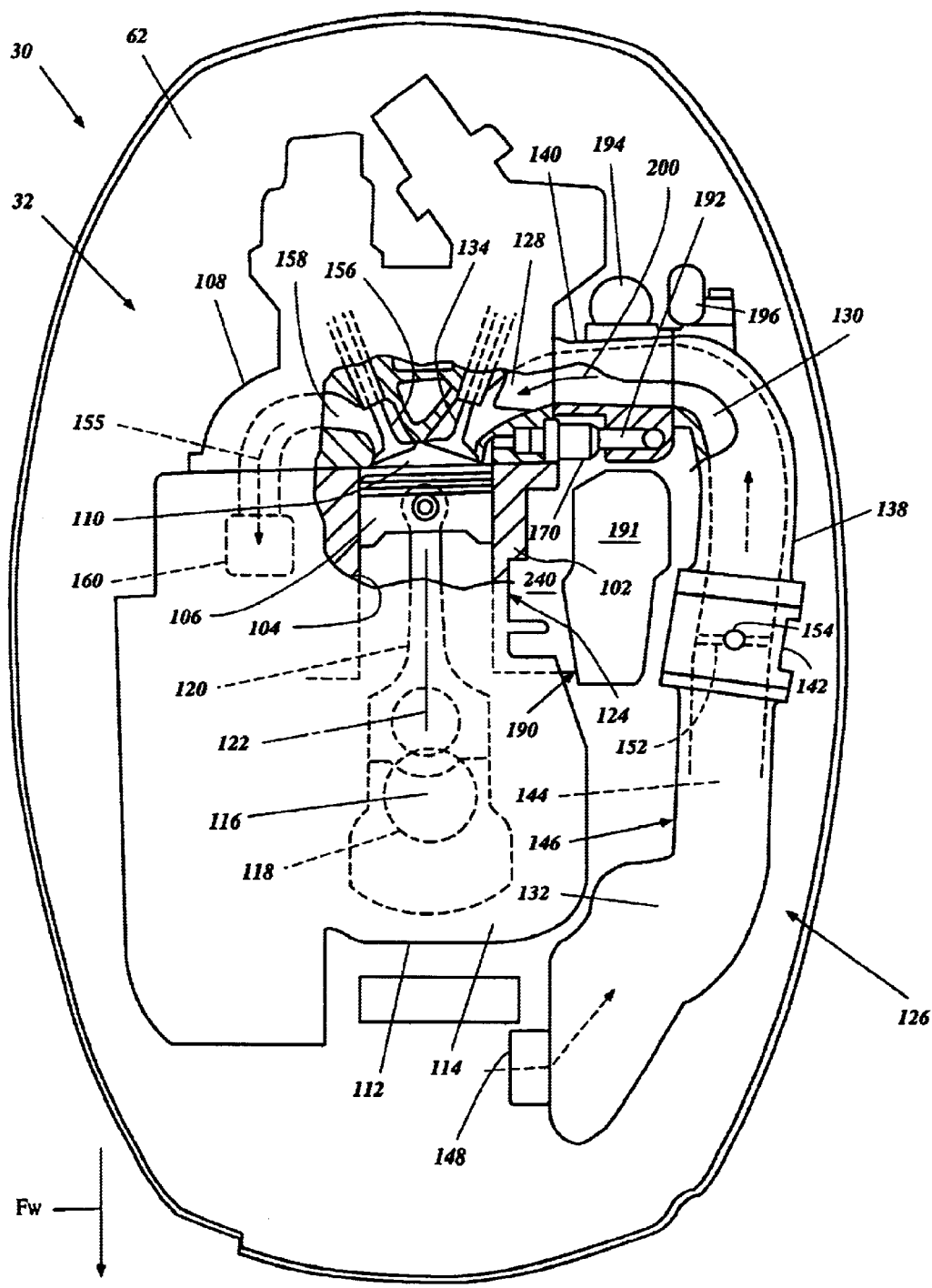
FIG. 2 is a top plan view of an outboard motor configured in accordance with a preferred embodiment of the present invention, with a portion of the engine shown in section.

With reference to FIGS. 1 and 2, an overall construction of an outboard motor 30 that employs an internal combustion engine 32 configured in accordance with certain features, aspects and advantages of the present invention is described below. The engine 32 has particular utility in the context of a marine drive, such as the outboard motor 30, and thus is described in the context of an outboard motor. The engine 32, however, can be used with other types of marine drives (i.e., inboard motors, inboard/outboard motors, jet drives, etc.) and also certain land vehicles. In any of these applications, the engine 32 can be oriented vertically or horizontally. Furthermore, the engine 32 can be used as a stationary engine for some applications that is apparent to those of ordinary skill in the art in light of the disclosure set forth herein.

In the illustrated arrangement, the outboard motor 30 generally comprises a drive unit 34 and a bracket assembly 36. The bracket assembly 36 supports the drive unit 34 on a transom 38 of an associated watercraft 40 and places a marine propulsion device 44 in a submerged position when the watercraft 40 rests on a surface of a body of water 42.

As used through this description, the terms "forward," "forwardly", "front", and the abbreviation "Fr" mean at or to the side where the bracket assembly 36 is located, and the terms "rear," "reverse," "backwardly" and "rearwardly" mean at or to the opposite side of the front side, unless indicated otherwise or otherwise readily apparent from the context use.

The illustrated drive unit 34 comprises a power head 50 and a housing unit 52 which includes a driveshaft housing 54 and a lower unit 56. The power head 50 is disposed atop the drive unit 34 and includes the internal combustion engine 32 and a protective cowling assembly 60.

Preferably, the protective cowling 60, which preferably is made of plastic defines a generally closed cavity 62 in which the engine 32 is disposed. The protective cowling assembly 60 preferably comprises a top cowling member 64 and a bottom cowling member 66. The top cowling member 64 preferably is detachably affixed to the bottom-cowling member 66 by a coupling mechanism so that a user, operator, mechanic or repairperson can access the engine 32 for maintenance or for other purposes.

The bottom cowling member 66 preferably has an opening (not shown) through which an upper portion of an exhaust guide member 98 (FIG. 1) extends. The exhaust guide member 98 preferably is made of aluminum alloy and is affixed atop the driveshaft housing 54. The bottom cowling member 66 and the exhaust guide member 98 together generally form a tray. The engine 32 is placed onto this tray and is affixed to the exhaust guide member 98. The exhaust guide member 98 also has an exhaust passage through which burnt charges (e.g., exhaust gases) from the engine 32 are discharged.

With reference to FIG. 2, the engine 32 in the illustrated embodiment preferably operates on a four-cycle combustion principle. The engine 32 has a cylinder block 102. The presently preferred cylinder block 102 defines four in-line cylinder bores 104 which extend generally horizontally and which are generally vertically spaced from one another. As used in this description, the term "horizontally" means that the subject portions, members or components extend generally in parallel to the water line 42 when the associated watercraft 40 is substantially stationary with respect to the water line 42 and when the drive unit 34 is not tilted and is placed in the position shown in FIG. 1. The term "vertically" in turn means that portions, members or components extend generally normal to those that extend horizontally.

This type of engine, however, merely exemplifies one type of engine on which various aspects and features of the present invention can be suitably used. Engines having other numbers of cylinders, having other cylinder arrangements (V, W, opposing, etc.), and operating on other combustion principles (e.g., crankcase compression two-stroke, diesel, or rotary) also can employ various features, aspects and advantages of the present invention. In addition, the engine can be formed with separate cylinder bodies rather than a number of cylinder bores formed in a cylinder block. Regardless of the particular construction, the engine preferably comprises an engine body that includes at least one cylinder bore.

A moveable member, such as a reciprocating piston 106, moves relative to the cylinder block 102 in a suitable manner. In the illustrated arrangement, the piston 106 reciprocates within each cylinder bore 104.

A cylinder head member 108 is affixed to one end of the cylinder block 102 to close one end of the cylinder bores 104. The cylinder head member 108, together with the associated pistons 106 and cylinder bores 104, preferably defines four combustion chambers 110. Of course, the number of combustion chambers can vary, as indicated above.

A crankcase member 112 closes the other end of the cylinder bores 104 and, together with the cylinder block 102, defines a crankcase chamber 114. A crankshaft or output shaft 118 extends generally vertically through the crankcase chamber 114 and can be journaled for rotation by several bearing blocks (not shown). A center axis 116 designates the axis about which the crankshaft 118 rotates.

Connecting rods 120 couple the crankshaft 118 with the respective pistons 106 in any suitable manner. Thus, the crankshaft 118 can rotate with the reciprocal movement of the pistons 106. An axis 122 illustrates the position of the center of the piston 106 and the position of the connecting rods 120 when the piston 106 is at its lowest possible position, bottom dead center (BDC), and when the piston 106 is at its highest possible position, top dead center (TDC).

Preferably, the crankcase member 112 is located at the forward most position of the engine 32, with the cylinder block 102 and the cylinder head member 108 being disposed rearward from the crankcase member 112. Generally, the cylinder block 102 (or individual cylinder bodies), the cylinder head member 108 and the crankcase member 112 together define an engine body 124. Preferably, at least these major engine portions 102, 108, 112 are made of an aluminum alloy. The aluminum alloy advantageously increases strength over cast iron while decreasing the weight of the engine body 124.

The engine 32 also comprises an air induction system 126. The air induction system 126 guides air from within the cavity 62 to the combustion chambers 110. The air induction system 126 preferably comprises four intake ports 128, four intake passages 130 and a single plenum chamber 132. In the illustrated arrangement, each of the intake ports 128 defines a single inlet opening on an outer surface of the cylinder head member 108. Additionally, each of the intake ports 128 defines to outlets terminating at the corresponding combustion chamber 110. The inlet end of each intake port 128 communicates with a single intake passages 130.

Intake valves 134 are slidably disposed at the outlet ends of the intake ports 128 within the cylinder head member 108 to move between an open and a closed position. As such, the valves 134 act to open and close the ports 128 to control the flow of air into the combustion chamber 110.

With reference to FIG. 2, each intake passage 130 preferably is defined by an intake passage body 140, a throttle body 142, an intake manifold 138, and an intake runner 144. The throttle body 142 preferably is made of aluminum alloy. The intake manifold 138, the intake passage body 140, and the intake runner 144 can be preferably made of plastic or aluminum. A portion of the illustrated intake runner 144 extends forwardly alongside of and to the front of the crankcase member 112.

With continued reference to FIG. 2, the respective portions of the intake runners 144, together with a plenum chamber member 146, define the plenum chamber 132. Preferably, the plenum chamber member 146 can also be made of plastic or aluminum.

The plenum chamber 132 comprises an air inlet 148. The air in the cavity 62 is drawn into the plenum chamber 132 through the air inlet 148. The air is then passed through the throttle body 142, the intake manifold 140, and the intake passages 130. Preferably, the plenum chamber 132 acts as an intake silencer to attenuate noise generated by the flow of air into the respective combustion chambers 110.

Each illustrated throttle body 142 has a butterfly type throttle valve 152 journaled for pivotal movement about an axis defined by a generally vertically extending valve shaft 154. Each valve shaft 154 can be coupled with the other valve shafts to allow simultaneous movement. The valve shaft 154 is operable by the operator through an appropriate conventional throttle valve linkage and a throttle lever connected to the end of the linkage. The throttle valves 152 are movable between an open position and a closed position to meter or regulate an amount of air flowing through the respective air intake passages 130. Normally, the greater the opening degree, the higher the rate of airflow and the higher the power output of the engine.

In order to bring the engine 32 to idle speed and to maintain this speed, the throttle valves 152 generally are substantially closed. Preferably, the valves are not fully closed to produce a more stable idle speed and to prevent sticking of the throttle valves 152 in the closed position. As used through the description, the term "idle speed" generally means a low engine speed that achieved when the throttle valves 152 are closed but also includes a state such that the valves 152 are slightly more open to allow a relatively small amount of air to flow through the intake passages 130.

The air induction system 126 preferably includes an auxiliary air device (AAD) (not shown) that bypasses the throttle valves 152 and extends from the plenum chamber 132 to the respective intake passages 130 downstream of the throttle valves 152. Idle air can be delivered to the combustion chambers 110 through the AAD when the throttle valves 152 are placed in a substantially closed or closed position.

The AAD preferably comprises an idle air passage, an idle valve and an idle valve actuator. The idle air passage is branched off to the respective intake passages 130. The idle valve controls flow through the idle air passage such that the amount of air flow can be more precisely controlled. Preferably, the idle valve is a needle valve that can move proportionally between an open position and a closed position, which closes the idle air passage. The idle valve actuator actuates the idle valve to a certain position to meter or adjust an amount of the idle air, and thus more finely adjust the idle speed of the engine.

The engine 32 also comprises an exhaust system that guides burnt charges, i.e., exhaust gases 155, to a location outside of the outboard motor 30. Each cylinder bore 104 preferably has two exhaust ports 158 defined in the cylinder head member 108. The exhaust ports 158 can be selectively opened and closed by exhaust valves. The exhaust valves are illustrated in FIG. 2 and identified by reference numeral 156. The construction of each exhaust valve and the arrangement of the exhaust valves are substantially the same as the intake valves 134 and the arrangement thereof, respectively.

An exhaust manifold 160 preferably is disposed next to the exhaust ports 158 and extends generally vertically. The exhaust manifold 160 communicates with the combustion chambers 110 through the exhaust ports 158 to collect exhaust gases therefrom. The exhaust manifold 160 is coupled with the foregoing exhaust passage of the exhaust guide member 98. When the exhaust ports 158 are opened, the combustion chambers 110 communicate with the exhaust passage through the exhaust manifold 160.

With reference to FIGS. 2, 3, 6, and 7, the engine 32 preferably has a direct fuel injection system. The fuel injection system preferably comprises four fuel injectors 170 with one fuel injector allotted for each of the respective combustion chambers 110. Several preferred embodiments regarding the fuel injection system of the present invention are discussed below in greater detail.

The engine 32 further comprises an ignition or firing system. Each combustion chamber 110 is provided with a spark plug (not shown) that is connected to an electronic control unit (ECU) (not shown) through an igniter so that ignition timing is also controlled by the ECU. Each spark plug has electrodes that are exposed into the associated combustion chamber and are spaced apart from each other with a small gap. The spark plugs generate a spark between the electrodes to ignite an air/fuel charge in the combustion chamber 110 at selected ignition timing under control of the ECU.

In the illustrated engine 32, the pistons 106 reciprocate between top dead center and bottom dead center. When the crankshaft 118 makes two rotations, the pistons 106 generally move from the top dead center to the bottom dead center (the intake stroke), from the bottom dead center to the top dead center (the compression stroke), from the top dead center to the bottom dead center (the power stroke) and from the bottom dead center to the top dead center (the exhaust stroke). During the four strokes of the pistons 106, camshafts make one rotation and actuate the intake valves 134 and the exhaust valves 156 to open the intake ports 128 during the intake stroke and to open exhaust ports 158 during the exhaust stroke, respectively.

Generally, during the intake stroke, air is drawn into the combustion chambers 110 through the air intake passages 130 and fuel is injected into the combustion chambers 110 through an auxiliary chamber 168 by the fuel injectors 170. The fuel can also be injected by the fuel injectors 170 directly into the combustion chamber 110 or into the intake passages 130. The air and the fuel thus are mixed to form the air/fuel charge in the combustion chambers 110. Slightly before or during the power stroke, the respective spark plugs ignite the compressed air/fuel charge in the respective combustion chambers 110. The air/fuel charge thus rapidly burns during the power stroke to move the pistons 106. The burnt charge, i.e., exhaust gases, then are discharged from the combustion chambers 110 during the exhaust stroke.

During engine operation, heat builds in the engine body 124. The illustrated engine 32 thus includes a cooling system to cool the engine body 124. The outboard motor 30 preferably employs an open-loop type water cooling system that introduces cooling water from the body of water surrounding the motor 30 and then discharges the water to the body of water. The cooling system includes one or more water jackets defined within the engine body 124 through which the water travels to remove heat from the engine body 124.

The engine 32 also preferably includes a lubrication system. A closed-loop type system is employed in the illustrated embodiment. The lubrication system comprises a lubricant tank defining a reservoir, which preferably is positioned within the driveshaft housing 54. An oil pump (not shown) is provided at a desired location, such as atop the driveshaft housing 54, to pressurize the lubricant oil in the reservoir and to pass the lubricant oil through a suction pipe toward certain engine portions, which desirably are lubricated, through lubricant delivery passages. Such engine portions include, for example, the crankshaft bearings (not shown), the connecting rods 120 and the pistons 106. Lubricant return passages (not shown) also are provided to return the oil to the lubricant tank for re-circulation.

With reference to FIG. 1, the driveshaft housing 54 depends from the power head 50 to support a driveshaft 178 which is coupled with the crankshaft 118 and which extends generally vertically through the driveshaft housing 54. The driveshaft 178 is journaled for rotation and is driven by the crankshaft 118. The driveshaft housing 54 preferably defines an internal section of the exhaust system that leads the majority of exhaust gases to the lower unit 56. An idle discharge section is branched off from the internal section to discharge idle exhaust gases directly out to the atmosphere through a discharge port that is formed on a rear surface of the driveshaft housing 54 during the idle speed of the engine 32. The driveshaft 178 preferably drives the oil pump.

With continued reference to FIG. 1, the lower unit 56 depends from the driveshaft housing 54 and supports a propulsion shaft 180 that is driven by the driveshaft 178. The propulsion shaft 180 extends generally horizontally through the lower unit 56 and is journaled for rotation. The propulsion device 44 is attached to the propulsion shaft 180. In the illustrated arrangement, the propulsion device includes a propeller 182 that is affixed to an outer end of the propulsion shaft 180. The propulsion device, however, can take the form of a dual counter-rotating system, a hydrodynamic jet, or any of a number of other suitable propulsion devices.

A transmission 184 preferably is provided between the driveshaft 178 and the propulsion shaft 180, which lie generally normal to each other (i.e., at a 90° shaft angle) to couple together the two shafts 178, 180 by bevel gears. The outboard motor 30 has a clutch mechanism that allows the transmission 184 to change the rotational direction of the propeller 182 among forward, neutral or reverse.

The lower unit 56 also defines an internal section of the exhaust system that is connected with the internal section of the driveshaft housing 54. At engine speeds above idle, the exhaust gases generally are discharged to the body of water surrounding the outboard motor 30 through the internal sections and then a discharge section defined within the hub of the propeller 182.

Fuel Supply Device

Figure 3:
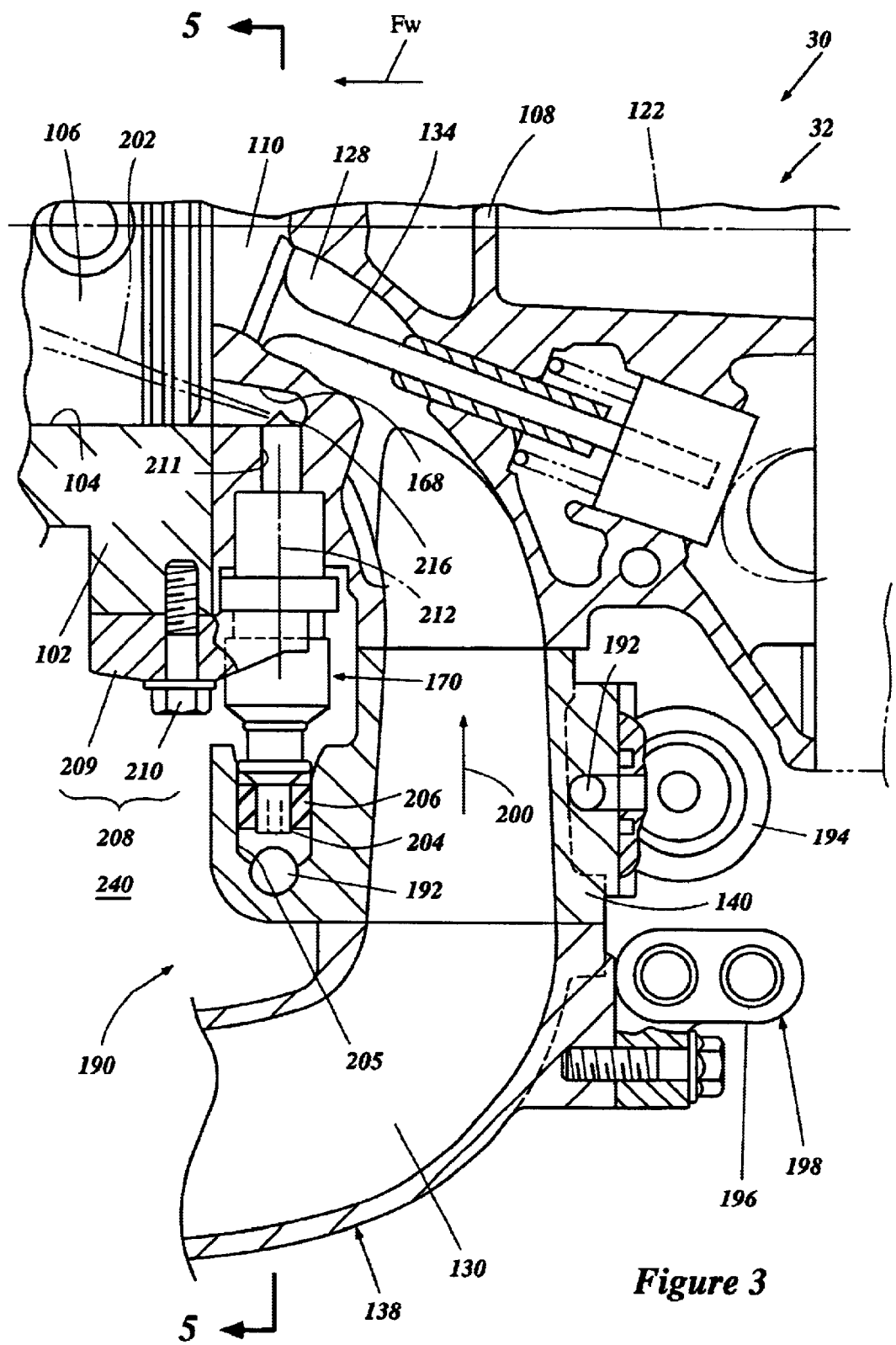
FIG. 3 is a sectioned view of a cylinder head, intake manifold, and fuel injector configured in accordance with a preferred embodiment of the present invention.

FIG. 3 illustrates a fuel delivery system 190 which preferably comprises a fuel pump and vapor separator assembly 191 and a fuel delivery passage 192, at least a part of which is defined by a portion of the induction system. In the illustrated embodiment, the fuel deliver passage 192 is defined within the intake passage body 140.

By defining at least a portion of the fuel delivery passage 192 with a portion of the induction system 126, the fuel delivery system can be more compact, allowing for the placement of various necessary fuel delivery system components. A fuel pressure regulator 194, an additional fuel cooler 196 as well as a fuel pressurizer 198 can all be mounted directly onto or in the close vicinity of the fuel passage body 190.

Mounting the various fuel delivery components directly or in the close vicinity of the intake passage body 140 allows for a further compact design, less complicated production, and cost savings. Additionally, induction air 200 traveling through the air induction system 126 cools the surrounding intake passage body 140. The lower temperature of the intake passage body 140 causes heat to flow from the fuel 202 drawn from a fuel tank 203 and flowing through the fuel delivery passages 192. The cooled fuel 202 when mixed with the induction air 200 within the combustion chamber 110 provides a cooler, more dense air/fuel mixture permitting the engine to operate more efficiently.

The fuel injector 170 is advantageously mounted in a position between the cylinder head member 108 and the intake passage body 140 allowing the fuel 202 to be delivered directly to the fuel injector 170 from the fuel delivery passages 192 omitting unnecessary additional fuel conduits.

A fuel delivery side 204 of the fuel injector 170 is positioned within a fuel injector inlet recess 205. Preferably, an o-ring 206 is disposed between the delivery side of the fuel injector and the fuel injector inlet 205 to provide an enhanced seal between the fuel injector 170 and the fuel delivery passage 192.

A fuel injector nozzle is advantageously positioned within a cylinder head assembly recess 211 allowing proper positioning of the fuel injector 170 with reference to the auxiliary chamber 168.

In one embodiment of the present invention a bracket assembly 208 advantageously holds the fuel injector in its mounted position between the intake passage body 140 and the cylinder head member 108. The bracket assembly 208 comprises a mounting bracket 209 and mounting bolt or fastener 210 to securely position the fuel injector 170 such that the fuel injector 170 is unable to rotate. A fuel injector mounting centerline 212 illustrates the position in which the fuel injector is placed. In the illustrated embodiment, the fuel injector 170 is mounted such that the centerline 212 is approximately perpendicular to the axis 122.

Figure 4:
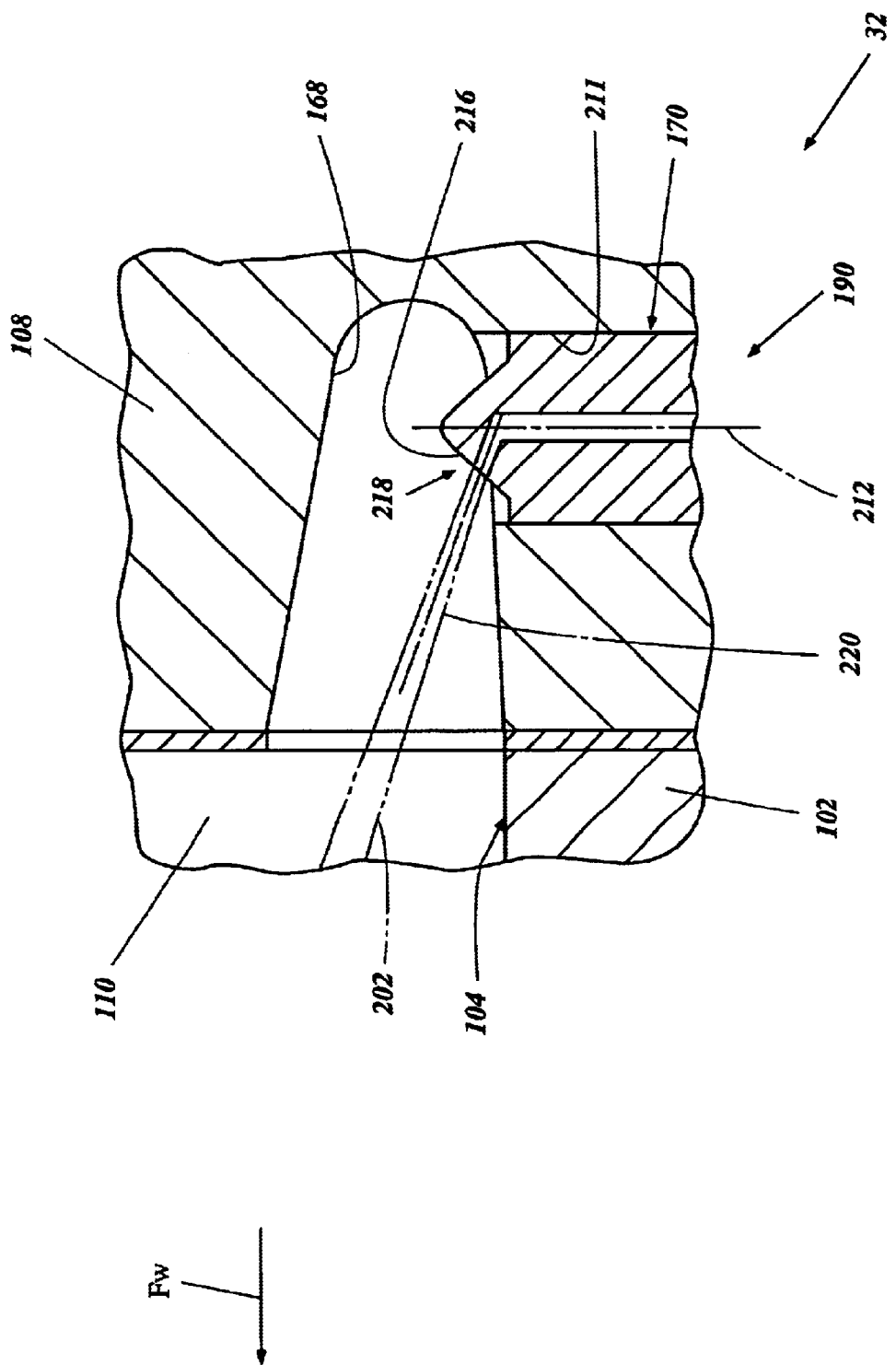
FIG. 4 is a sectioned view of the cylinder head and fuel injector of an outboard motor configured in accordance with a preferred embodiment of the present invention, with a fuel spray direction shown.
Figure 6:
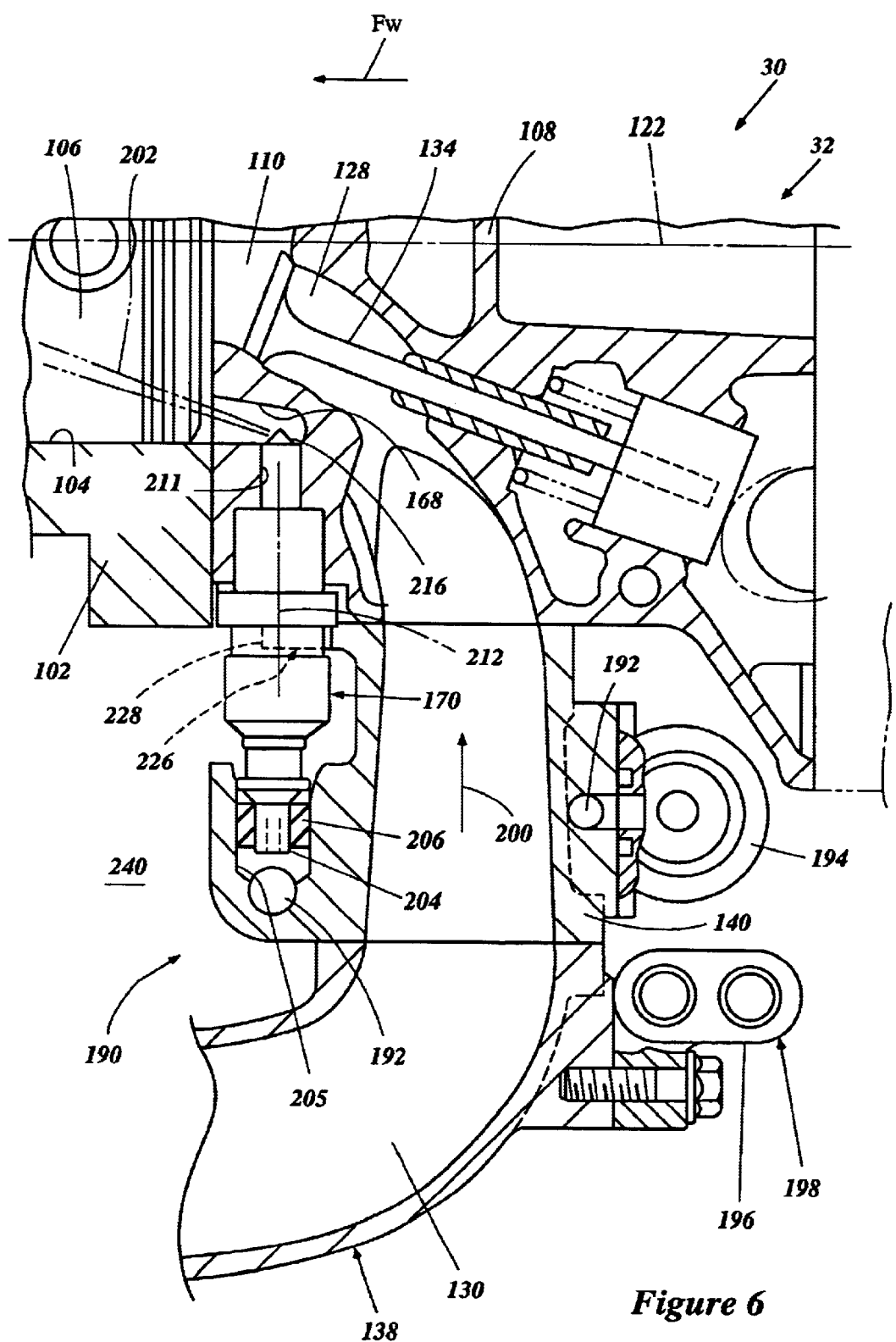
FIG. 6 is a sectioned view of a modification of the cylinder head, intake manifold, and fuel injector illustrated in FIG. 4.
Figure 7:
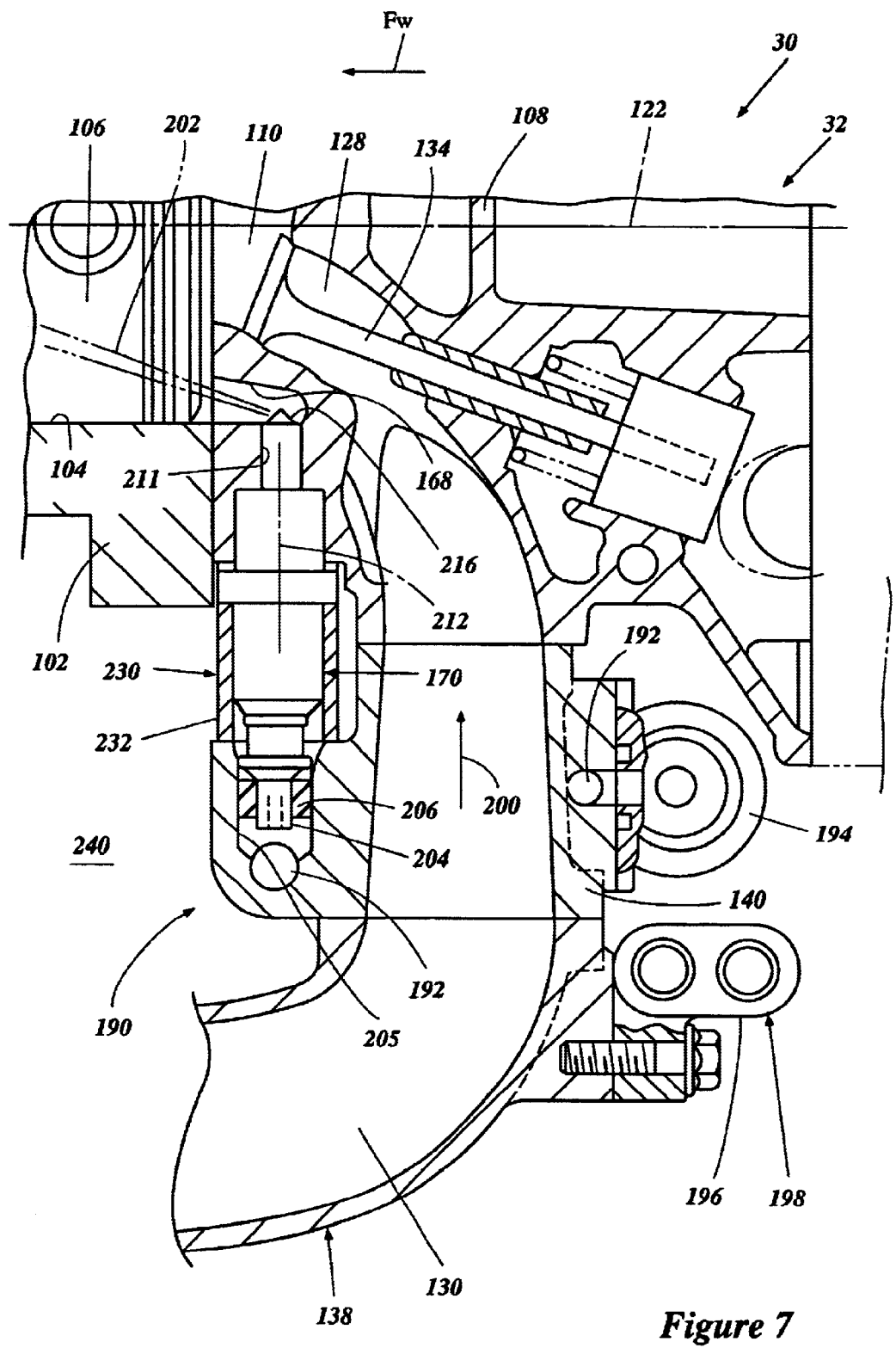
FIG. 7 is a sectioned view of a further modification of the cylinder head, intake manifold, and fuel injector illustrated in FIG. 4.

As shown in FIGS. 2 and 4, as well as FIGS. 6 and 7, the fuel injector 170 is disposed substantially between the portion of the intake passages 130 defined by the body 140 and a plane defined by the mating surfaces of the cylinder head assembly 108 and the cylinder block 102. As such, the fuel injector 170 is compactly arranged within the cavity 62.

With reference to FIG. 4, a fuel injector nozzle 216 is shown delivering fuel 202 through an orifice 218 positioned at a predetermined angle. An orifice centerline 220 shows the direction in which the injected fuel is delivered with reference to the fuel injector centerline 212 directly into the combustion chamber 110 through an auxiliary chamber 168.

The auxiliary chamber 168 allows for the fuel injector 170 to be positioned advantageously between the cylinder block 102 and the intake port 128. Such a placement of the fuel injector 170 further allows the integrated fuel delivery passages 192 to properly cool and deliver fuel to the fuel injector 170.

Figure 5:
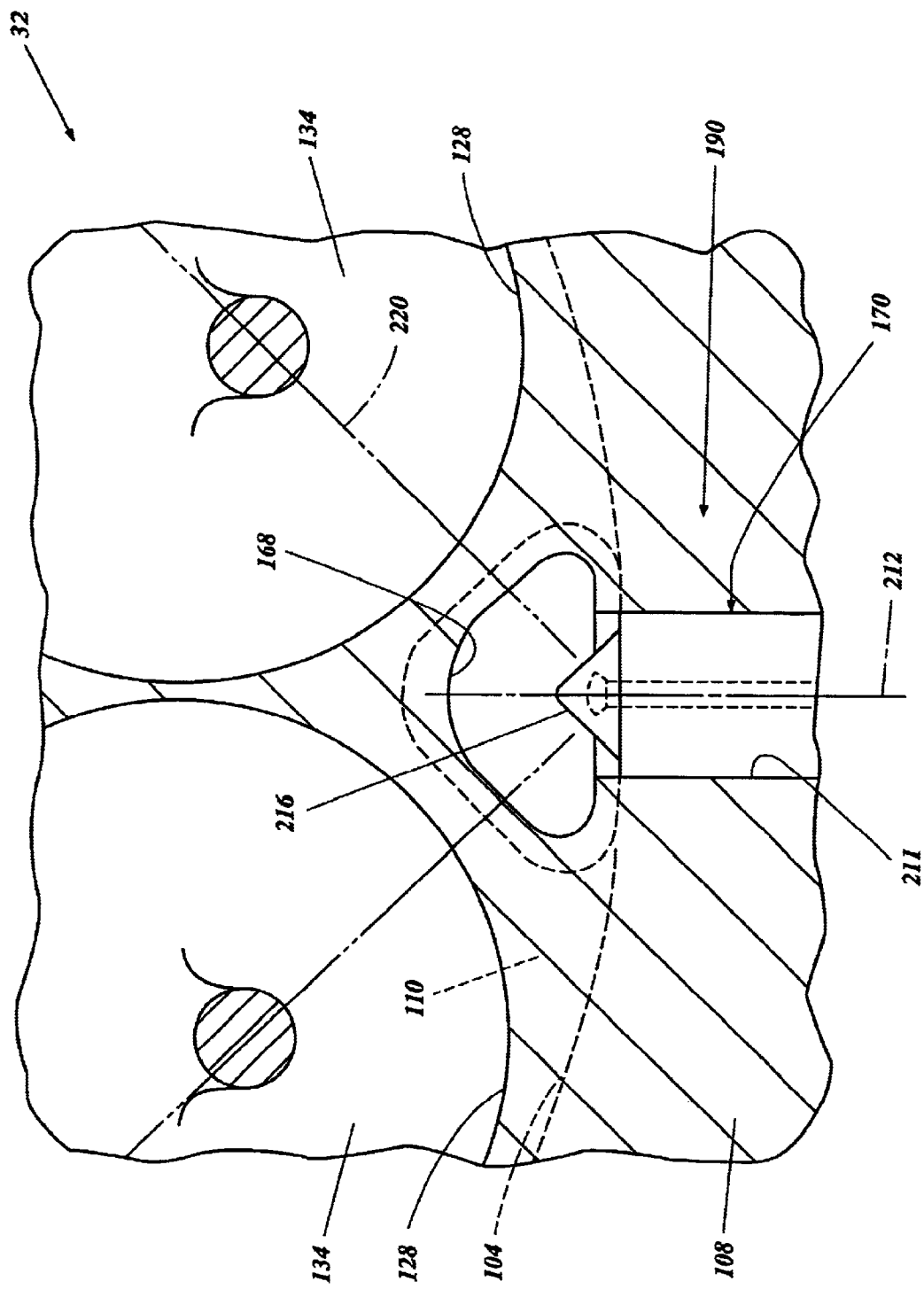
FIG. 5 is a sectioned view of the cylinder head and fuel injector of an outboard motor taken along the line 5—5 of FIG. 3, with the shape of the fuel injector tip shown.

FIG. 5 illustrates a partial plan view of the inner surface of the cylinder head member 108, as viewed from the top of the piston 106, and shows the predetermined angle of the fuel injector nozzle orifice 218. The injected fuel is directly injected into the combustion chamber 110 through the auxiliary chamber 168. The predetermined fuel injector orifice angle directs the fuel on each side of the combustion chamber 110 over a range from one intake valve 134 to the other intake valve. The fuel spray range provides improved atomization of the fuel and can allow for stratified-charge operation.

FIG. 6 illustrates a modification of the fuel injector mounting bracket assembly shown in FIG. 5. As shown in FIG. 6, a fuel injector bracket 228 is attached to the intake passage body 140. The bracket 228 includes a retention portion configured to engage the fuel injector 170. In the illustrated embodiment, the retention portion includes a substantially u-shaped portion having two arms which straddle the fuel injector 170.

Constructed as such, assembly of the fuel delivery system 190 is simplified by integrating the fuel injector bracket 228 with the intake passage body 140. The integrated fuel injector bracket 228 provides exact positioning of the fuel injector with reference to the cylinder head assembly 108 without the need for separate assemblies and fasteners, lowering the overall cost of the internal combustion engine 32.

Preferably, the fuel injector bracket 228 is formed monolithically with a portion of the induction system 126. In the illustrated embodiment, the fuel injector bracket 228 is formed monolithically with the intake passage body 140. Constructed as such, the bracket transmits less heat from the engine body 124 to the fuel injector 170. In additional, because the bracket 228 is monolithic with the body 140, heat can be transferred from the fuel injector 170 to the intake passage body 140. During operation of the engine 32, air flows quickly through the intake passage body 140, thereby aiding in the absorption of heat from the fuel injector 170 through the bracket 228.

FIG. 7 illustrates yet another modification of the fuel injector mounting bracket assembly 230 illustrated in FIG. 4. As illustrated in FIG. 7, a collar 232 surrounds the fuel injector 170. The collar has an outer end that abuts a portion of the induction system 126. In the illustrated embodiment, the outer end of the collar abuts the body 140. An inner end of the of the collar abuts the body of the fuel injector 170.

The collar 232 is sized so as to provide the correct spacing to hold the fuel injector 170 in a proper position with reference to the cylinder head assembly 108. The collar 232 allows for successful positioning and mounting of the fuel injector 170 without the need for separate assemblies and fasteners, lowering the overall cost of the internal combustion engine 32. In the illustrated embodiment, the collar is illustrated as a tube formed separately from the fuel injector 170. However, the collar can be formed integrally with the injector 170. Additionally, the collar 232 can have shapes other than a tube.

As illustrated in FIGS. 2, 3, 6, and 7, the portion of the induction system 126 defined by the intake passage body 140 extends transverse relative to the axis 122. The induction passages 130 extend from the outer end of the intake passage body 140 and curve forwardly, thus leaving a space 240 between the induction system 126 and the engine body. Thus, the space 240 can be used for mounting other components, for example, but without limitation, the fuel pump and vapor separator assembly 191.

The extent to which the portion of the intake passage defined by the intake passage body 140 is straight affects the lateral dimension of the space 240. Thus, by shaping the intake passage 130, including the portion defined by the intake passage body 140, to extend around the fuel injector 170, the space 140 is enlarged sufficiently to accommodate additional components, thus allowing a compact arrangement within the cavity 62. Additionally, because the intake passages 130 extend around two sides of the fuel injector 170 and the space 240, the heating affect of the engine body 124 is at least partially compensated for by the cooling effect of the intake passage 130.

A further advantage is achieved by forming the portion of the induction system 126 which communicates with a portion of the fuel delivery system 190, separate from the remaining portion of the induction system 126. For example, in the illustrated embodiments, the intake passage body 140 defines the fuel delivery passage 192 and also supports the fuel regulator 194. Additionally, the intake passage body 140 defines the fuel injector mounting recess 205. Preferably, this portion of the induction system 126 is formed from a high-strength material, such as a metal. Where a portion of the induction system is also used to retain the fuel injector 170 in communication with a combustion chamber of an engine, the strength requirements on this portion of the induction system 126 are even greater. However, the remaining portion of the induction system 126, including the intake manifold 138, can be made from a lighter material because this portion of the induction system only needs to be strong enough to define airflow passages appropriate for internal combustion engine. Thus, this portion of the induction system 26 preferably is made from a lightweight material, such as plastic.

Thus, by constructing the portion of the induction system 126 which defines a portion of the fuel delivery passage as a separate component from the remaining portion of the induction system 126, the entire induction system 126 can be made lighter. Thus, the separate construction of the different portions of the induction system 126 provides additional advantages.

Although the present invention has been described in terms of a certain preferred embodiments; other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. An engine having an engine body comprising a cylinder body defining a cylinder bore and a cylinder head closing one end of the cylinder bore, the cylinder head and cylinder bore defining at least one variable volume combustion chamber, at least one intake port opening into the chamber, an induction system communicating with the intake port through at least one intake passage member defining at least one intake passage, an intake valve being moveable to regulate communication between the induction system and the combustion chamber through the port and the intake passage, a fuel delivery system having at least one fuel delivery passage connected to at least one fuel injector, the fuel delivery passage being defined by the intake passage, the fuel injector being positioned between the cylinder body and the intake passage, the intake passage member connected to the fuel injector, the fuel injector configured to deliver fuel directly to the combustion chamber.

2. An engine as set forth in claim 1, wherein the fuel injector extends generally parallel and adjacent to a portion of the intake passage.

3. An engine as set forth in claim 1, wherein the fuel delivery passage delivers fuel to the fuel injector.

4. An engine comprising an engine body including a cylinder body defining a cylinder bore and a cylinder head closing one end of the cylinder bore, the cylinder head and cylinder bore defining at least one combustion chamber, an induction system configured to guide air to the combustion chamber, a fuel system comprising at least one fuel passage configured to deliver fuel to the combustion chamber for combustion therein, at least a portion of the fuel passage being defined by a portion of the induction system, wherein the fuel system comprises at least one fuel injector mounted to the engine body adjacent to the cylinder body and configured to inject fuel directly into the combustion chamber and wherein the fuel injector is disposed between the cylinder body and a portion of the induction system.

5. The engine according to claim 4, wherein the fuel injector is arranged so as to spray fuel through an auxiliary passage before entering the combustion chamber.

6. The engine according to claim 4, wherein the portion of the induction system extends around two sides of the fuel injector.

7. The engine according to claim 4, wherein a junction between the cylinder body and the cylinder head defines a plane, the fuel injector being disposed between the plane and a portion of the induction system.

8. An engine comprising an engine body defining at least one combustion chamber, an induction system configured to guide air to the combustion chamber, a fuel system comprising at least one fuel passage configured to deliver fuel to the combustion chamber for combustion therein, at least a portion of the fuel passage being defined by a portion of the induction system, wherein the fuel system comprises at least one fuel injector configured to inject fuel directly into the combustion chamber and wherein the induction system extends around three sides of the fuel injector.

9. An engine comprising an engine body defining at least one combustion chamber, an induction system configured to guide air to the combustion chamber, a fuel system comprising at least one fuel passage configured to deliver fuel to the combustion chamber for combustion therein, at least a portion of the fuel passage being defined by a portion of the induction system, wherein the fuel system comprises at least one fuel injector configured to inject fuel for combustion in the combustion chamber and wherein the engine body includes a mounting aperture separate from the induction system, for receiving the fuel injector, the induction system being configured to engage the fuel injector so as to retain the fuel injector in the mounting aperture.

10. An internal combustion engine comprising an engine body defining at least one combustion chamber, an induction system configured to guide air to the combustion chamber, a fuel system configured to deliver fuel to the combustion chamber for combustion therein, the fuel system including at least one fuel injector having an outlet end mounted for injecting fuel directly into the combustion chamber without passing through the induction system, the induction system defining at least a portion of the fuel system, the induction system including means for engaging an inlet end of the fuel injector.

11. An outboard motor comprising an engine, the engine including an engine body including a cylinder body defining a cylinder bore and a cylinder head closing one end of the cylinder bore, the cylinder head and cylinder bore defining at least one combustion chamber therein, an induction system configured to guide air to the combustion chamber, a fuel injection system configured to inject fuel for combustion in the combustion chamber, the fuel injection system includes at least one fuel injector and a fuel delivery passage configured to deliver fuel to the fuel injector, at least one portion of the induction system defining at least a portion of the fuel delivery passage, wherein the fuel injector is mounted to the engine body adjacent to the cylinder body and configured to inject fuel directly into the combustion chamber and wherein the fuel injector is disposed between the cylinder body and a portion of the induction system.

12. The outboard motor according to claim 11, wherein the engine body comprises a cylinder block and a cylinder head, the joint between the cylinder block and the cylinder head defining a plane, the fuel injector being mounted between the plane and portion of the induction system.

13. An outboard motor comprising an engine, the engine including an engine body defining at least one combustion chamber therein, an induction system configured to guide air to the combustion chamber, a fuel injection system configured to inject fuel for combustion in the combustion chamber, the fuel injection system includes at least one fuel injector and a fuel delivery passage configured to deliver fuel to the fuel injector, at least one portion of the induction system defining at least a portion of the fuel delivery passage, wherein the portion of the induction system defining a portion of the fuel delivery passage is formed from a first material, a further portion of the induction system being formed of a second material.

14. An outboard motor comprising an engine, the engine including an engine body defining at least one combustion chamber therein, an induction system configured to guide air to the combustion chamber, a fuel injection system configured to inject fuel for combustion in the combustion chamber, the fuel injection system includes at least one fuel injector having an outlet end mounted to the engine body for injecting fuel directly into the combustion chamber and a fuel delivery passage configured to deliver fuel to the fuel injector, at least one portion of the induction system defining at least a portion of the fuel delivery passage, wherein the induction system defines an induction passage extending from the engine body, outwardly from the engine body, and around an outer end of the fuel injector, the induction passage extending from the outer end of the fuel injector forwardly.

15. The outboard motor according to claim 14, wherein a portion of the induction passage extends parallel to an axis of the fuel injector.

16. The outboard motor according to claim 15, additionally comprising a fuel pump and vapor separator assembly disposed between the engine body and a portion of the induction system.

17. An outboard motor comprising an internal combustion engine, the engine including an engine body defining at least one combustion chamber therein, an induction system configured to guide air to the engine body for combustion in the combustion chamber, a fuel system including at least one fuel injector configured to supply fuel for combustion in the combustion chamber, the at least one fuel injector comprising an outlet end mounted to a cylinder head of the engine body for injecting fuel directly into the combustion chamber without passing through the induction system, the induction system comprising means for defining at least a portion of a fuel passage of the fuel system and means for engaging an inlet end of the at least one fuel injector.

* * * * *